(No Model.)
C. P. DYER.
FRICTION PIVOT FOR MIRRORS OR TRANSOMS.
No. 595,613. Patented Dec. 14, 1897.
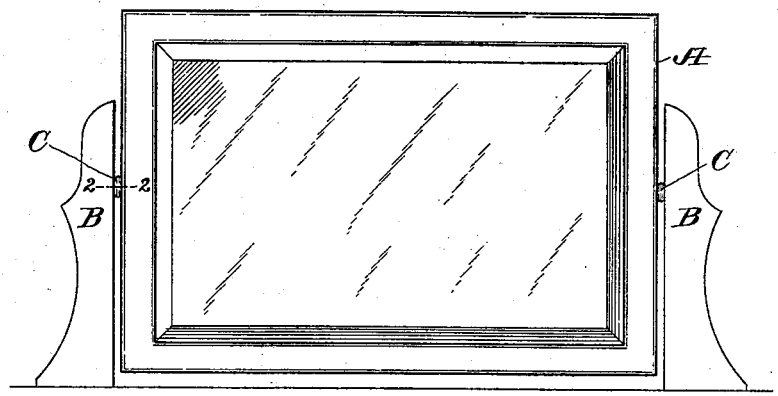
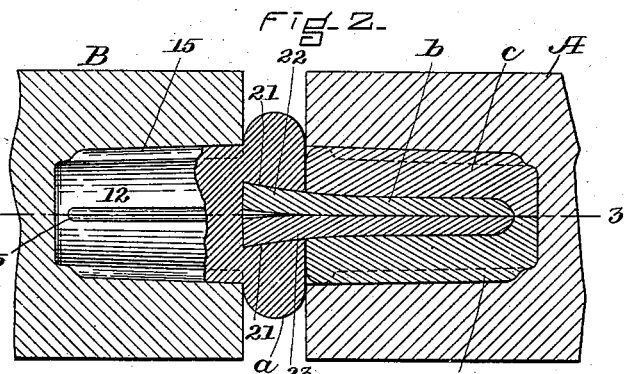
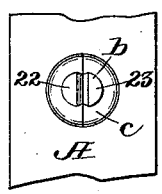
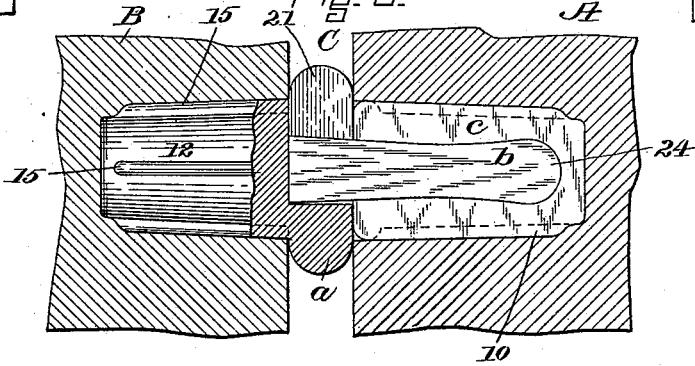
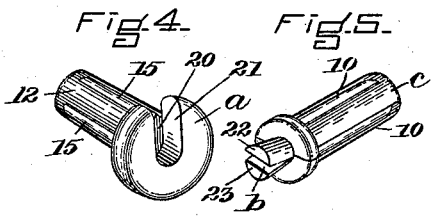
WITNESSES.
A. D. Brown
B. L. Marden
INVENTOR.
Charles P. Dyer.
by H. Tatschernach
Atty.

UNITED STATES PATENT OFFICE.

CHARLES P. DYER, OF SOMERVILLE, MASSACHUSETTS.

FRICTION-PIVOT FOR MIRRORS OR TRANSOMS.

SPECIFICATION forming part of Letters Patent No. 595,613, dated December 14, 1897.

Application filed April 22, 1897. Serial No. 633,395. (No model.)

*To all whom it may concern:*

Be it known that I, CHARLES P. DYER, a citizen of the United States, residing at Somerville, in the county of Middlesex and State of Massachusetts, have invented an Improved Friction Supporting Device for Mirrors, Transoms, and the Like, of which the following is a full, clear, and exact description, reference being had to the accompanying drawings, making part of this specification, in which—

Figure 1 is a front elevation of a mirror and its standards having my improved friction supporting device applied thereto. Fig. 2 is an enlarged horizontal section on the line 2 2 of Fig. 1. Fig. 3 is a vertical section on the line 3 3 of Fig. 2. Figs. 4 and 5 are perspective views of the two portions of the hinge. Fig. 6 is an end view of the socket member of the hinge. Fig. 7 is an end view of the pivot-pin member of the hinge.

My invention has for its object to produce a simple and effective friction hinge or supporting device for swinging mirrors, transoms, and the like where it is desired to hold the frame or article in such manner as to prevent it from swinging too freely on its pivots; and my invention consists of a hinge or supporting device composed of two leaves or members, one of said members being provided with a U-shaped dovetailed socket lying in a vertical plane for the reception of the pivot-pin or pintle of the other member, said pin being divided axially to form two diverging spring branches at its outer end, which engage the dovetailed socket in such manner that when the pin is turned within said socket from one position to another its flaring or diverging spring ends will be compressed and forced toward each other by contact with the sides of the socket, thus producing the desired friction between the two members of the hinge, as hereinafter fully set forth.

In the said drawings, A represents a swinging mirror-frame, and B B the standards between which it is hung by means of my improved friction hinges or supporting devices C C, each of which is composed of a socket member *a*, having its face in a vertical plane, and a pin or pintle member *b*, the latter being preferably inclosed within an axially-divided tubular holder *c*, which is adapted to be driven into a hole bored in the side of the mirror-frame at the center of its thickness, longitudinal ribs 10 being formed on the outside of the holder to prevent it from being turned after being driven into the hole. The socket member *a* is provided with a solid shank 12 at right angles to its vertical face and adapted to be driven into a hole bored in the standard B at the center of its thickness and opposite to the holder *c*, said shank being also provided with longitudinal ribs 15 to prevent it from turning within the hole into which it is driven. The outer circular portion of the member *a* is provided with a U-shaped socket-slot 20, open at its top and having its side walls 21 dovetailed or beveled inward, as shown in Fig. 2, said slot receiving the outer end of the pintle-pin *b*, which is entered at the open end of said slot and forced down to the bottom thereof.

The pin *b* is composed of tempered steel and is preferably divided axially into two halves, as shown, each of which fits snugly within the corresponding half of the holder *c*, the interior of which is enlarged at its front end to permit the front ends of the two portions of the pin to be spread apart to form two diverging spring branches 22 23, which project beyond the end of the holder *c*, as shown in Figs. 2, 3, and 5.

The pin *b* is enlarged at its rear end, as shown at 24, to prevent its being drawn lengthwise out of the holder *c*, and is also flattened diametrically or otherwise properly shaped to prevent it having any axial movement within said holder.

The holder *c* is driven into the mirror-frame, so that the two diverging spring branches of the pin *b* will lie on opposite sides of a vertical plane passing between them when the mirror is in a vertical position, and when the mirror is to be hung it is held in a horizontal position, which causes the said two spring branches of the pin to lie one over the other, in which position they will readily enter the slot 20 and rest on the bottom thereof, the outer end of the pin being slightly enlarged to fit the inclined or dovetailed vertical walls of the slot 20, whereby it is locked in place, the two leaves or members of the hinge being thus securely held together, as required, and all liability of the spreading apart of the supporting-standards thus effectually prevented. As soon as the pivot-pins $b$ have been dropped into their sockets the mirror is swung up into its normal vertical position, thus turning the pin $b$ a quarter-revolution within the socket 20, which causes the diverging spring ends 22 23 of said pin to be brought forcibly into contact with the side walls of the socket, and as the distance between said walls is less than that across the separated spring bifurcations or ends of the pin they will be compressed and forced toward each other, as shown in Fig. 2, producing the desired friction between the two members of the hinge to prevent the mirror-frame or other article supported by the device from swinging too freely on its pivots and cause it to remain fixed at any angle in which it may be placed. Instead of making the axially-divided pin $b$ in two separate pieces, as shown, it may be made of a single piece of tempered steel doubled at its inner end and having its outer ends spread apart and of the same shape as those of the pin first described, and such pin, if properly formed for the purpose, could be driven directly into the wood, in which case the holder $c$ would not be required.

The above-described supporting device is exceedingly simple, durable, and effective and may be used for a great variety of different purposes wherever it is desired to support a frame or other object in such manner as to admit of its being freely turned on its pivots and then remain fixed in any position in which it may be left.

Among the many advantages possessed by my improved friction device may be enumerated the following: No fastening-screws are employed, the two members of the device being driven into holes bored in the wood for the purpose. The frame will hang from the center of its thickness instead of from the back, and being thus evenly balanced will not therefore have any tendency to tip over. Consequently less friction is required to hold it in place. It is out of the way and forms a neat finish, the visible portion of the socket resembling a washer and serving to equalize the width of the space between the supporting-standards and the mirror-frame. The two members are easily and instantaneously detachable, the one from the other, as there are no screws or other fastenings to be removed, and the flaring separated spring ends of the pivot-pin fitting within the inclined or dovetailed sides of the socket-slot prevent the spreading apart or separating of the supporting-standards of the mirror-frame, as the pivot-pin cannot be withdrawn longitudinally from its socket, but must be disconnected by lifting it out of the same.

What I claim as my invention, and desire to secure by Letters Patent, is—

1. A friction supporting device for mirrors, transoms and the like, consisting of a vertical U-shaped socket having inclined or dovetailed sides and a pivot-pin or pintle divided axially to form two diverging spring branches at its outer end for engagement with said socket in such manner that the turning of the pin within the socket from one position to another will cause the diverging spring ends of said pin to be compressed and forced toward each other to produce increased friction between the pin and socket, substantially as described.

2. A friction supporting device for mirrors, transoms and the like, comprising a vertical U-shaped socket having inclined or dovetailed sides and being provided with a rearwardly-extending shank adapted to be driven into the article to which the socket is to be attached, and a pivot-pin or pintle, divided axially to form two diverging spring branches at its outer end for engagement with said socket in such manner that the turning of the pin within the socket from one position to another will cause the diverging spring ends of said pin to be compressed and forced toward each other to produce increased friction between the pin and socket, substantially as described.

3. A friction supporting device composed of two leaves or members, one member consisting of an axially-divided holder adapted to be driven into the article to which it is to be attached and containing a pivot-pin or pintle divided axially to form two diverging spring branches, and the other member consisting of a vertical U-shaped socket for the reception of the separated spring ends of the pivot-pin, said socket having inclined or dovetailed sides and being provided with a rearwardly-extending shank adapted to be driven into the article to which the socket is to be attached, the turning of the pivot-pin within the socket from one position to another causing the diverging ends or branches of said pin to be compressed and forced toward each other to produce increased friction between the pin and socket, substantially as described.

4. In a friction supporting device, the combination with the axially-divided holder $c$, of the pivot-pin or pintle $b$ axially divided to form two diverging spring branches projecting beyond the ends of its holder, and means for preventing said pin from turning within said holder and being withdrawn longitudinally from the same, substantially as set forth.

Witness my hand this 20th day of April, A. D. 1897.

CHARLES P. DYER.

In presence of—
P. E. TESCHEMACHER,
V. E. TEDFORD.